US006839577B2

(12) United States Patent
Krenz et al.

(10) Patent No.: US 6,839,577 B2
(45) Date of Patent: Jan. 4, 2005

(54) ELECTRONIC DEVICE HAVING A MULTI-STATE ANTENNA GROUND STRUCTURE

(75) Inventors: Eric Krenz, Crystal Lake, IL (US); Rachid Alameh, Crystal Lake, IL (US); Christopher Cash, Wonder Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 192 days.

(21) Appl. No.: 10/331,845

(22) Filed: Dec. 30, 2002

(65) Prior Publication Data

US 2004/0198248 A1 Oct. 7, 2004

(51) Int. Cl.[7] .................................................. H04M 1/00

(52) U.S. Cl. ................................ 455/575.7; 455/575.3; 343/848

(58) Field of Search ........................... 455/575.3, 575.7, 455/90.1, 90.2, 90.3, 550.1, 556.1, 556.2, 578.5; 343/702, 770, 700, 848, 849, 860; 379/433.01, 433.13

(56) References Cited

U.S. PATENT DOCUMENTS

| | | | | |
|---|---|---|---|---|
| 5,335,368 A | * | 8/1994 | Tamura | 455/575.7 |
| 5,542,106 A | | 7/1996 | Krenz et al. | |
| 5,561,437 A | * | 10/1996 | Phillips et al. | 343/702 |
| 5,821,903 A | * | 10/1998 | Williams | 343/702 |
| 6,266,538 B1 | * | 7/2001 | Waldron | 455/575.7 |
| 6,327,485 B1 | * | 12/2001 | Waldron | 455/575.3 |
| 6,342,859 B1 | * | 1/2002 | Kurz et al. | 343/702 |
| 6,421,016 B1 | | 7/2002 | Phillips et al. | |
| 6,490,435 B1 | * | 12/2002 | Ma et al. | 455/90.1 |
| 6,600,450 B1 | * | 7/2003 | Efanov et al. | 343/726 |

* cited by examiner

*Primary Examiner*—Charles Appiah
(74) *Attorney, Agent, or Firm*—Marshall, Gerstein & Borun LLP

(57) ABSTRACT

An electronic device (100) has a multi-state antenna ground structure (428, 500) integrated into the device housing. Configuration of the electronic device (100) for use in one of at least two operable configurations automatically causes a switching of the ground structure to improve antenna efficiency. Metal plates (416, 424) are secured within movable portions (104, 114) of the device housing such that in a first configuration the metal plates are in close proximity and act as a low impedance path for switching the ground structure to a first state. In a second configuration of the electronic device (100) the plates are separated an act as a high impedance path for switching the ground structure to a second state.

16 Claims, 5 Drawing Sheets

ELECTRONIC DEVICE HAVING A MULTI-STATE ANTENNA GROUND STRUCTURE

TECHNICAL FIELD

This patent relates generally to wireless communication devices and more particularly to an electronic device having a multi-state antenna ground structure.

BACKGROUND

Electronics devices such as cellular telephones, pagers, portable email and Internet appliances, personal digital assistants (PDAs), and the like are becoming smaller and multifunctional. For example, a cellular telephone may incorporate an electronic organizer, or a personal digital assistant may include an integrated camera and provide wireless email, Internet access, or even cellular telephone functionality.

To facilitate the multifunctional aspects of these devices, designers have adopted numerous different form factors. For example, the cellular telephone body may open clamshell-style to reveal an enlarged keypad and screen to facilitate use of the device as an electronic organizer. Alternatively, the cellular telephone may include an enlarged screen that may be rotated outwardly from the body of the telephone to facility viewing of Internet content.

Antennas for wireless electronic devices have traditionally been designed to extend outwardly from a portion of the device housing. Antennas have also been constructed internal of the device housing and integral with portions of the device housing. When integrated into a movable portion of the device housing, it is necessary to ensure the antenna will operate well in each of the disparate operating positions of the device. A difficulty in the antenna design arises when the device is operated in a configuration for which the antenna has not been tuned. This is because the impedance matching of the antenna is highly dependent upon the position of the antenna relative to the user and other electronics contained within the electronic device. If the antenna is not tuned to operate in that position, it may perform poorly. Thus, there is a need for an antenna that functions efficiently in an electronic device having numerous disparate operating positions.

BRIEF DESCRIPTION OF THE DRAWINGS

The present patent is illustrated by way of examples and not limitations in the accompanying figures, in which like references indicate similar elements.

DETAILED DESCRIPTION

An electronic device, such as a cellular telephone, a pager, a wireless email/Internet appliance, and the like employs a switchable antenna ground structure that switches responsive to an operating mode of the electronic device. The antenna ground structure may switch from a first ground structure state to a second ground structure state, automatically upon reconfiguration of the device from a first operable configuration to a second operable configuration.

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
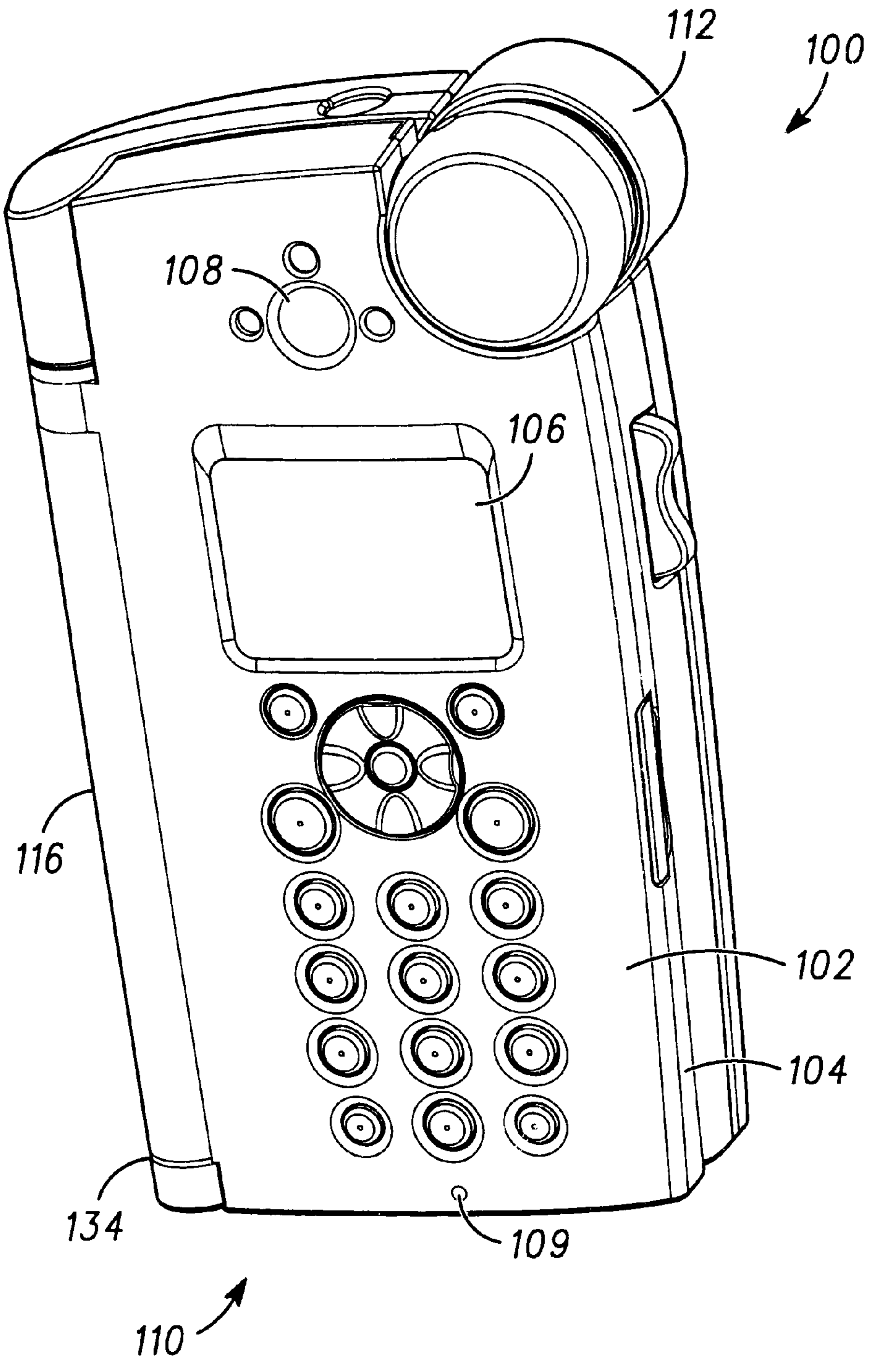
FIG. 1 is a front perspective view of an electronic device incorporating a multi-state ground structure in a first operating configuration.
Figure 2:
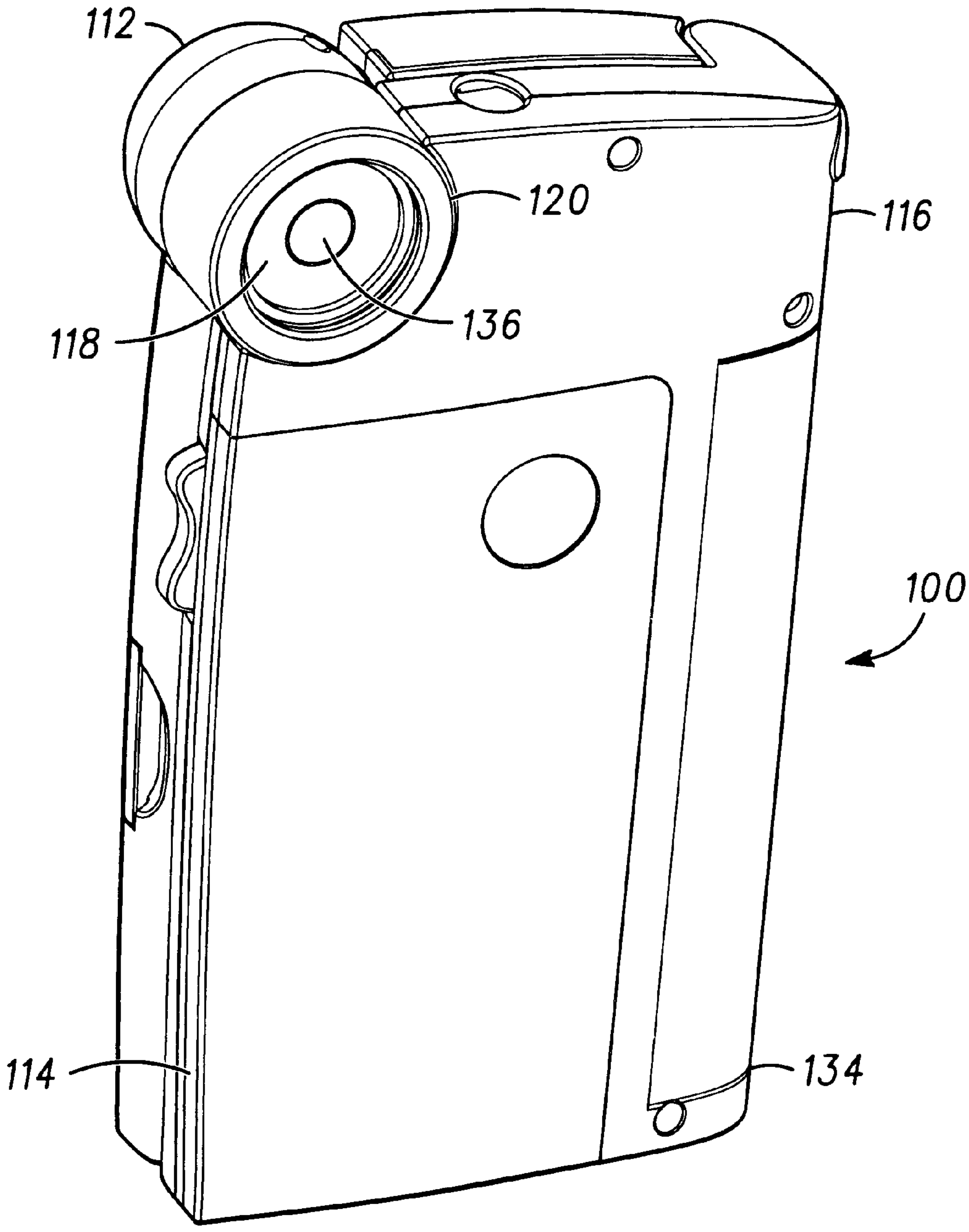
FIG. 2 is a rear perspective view of the electronic device illustrated in FIG. 1.
Figure 3:
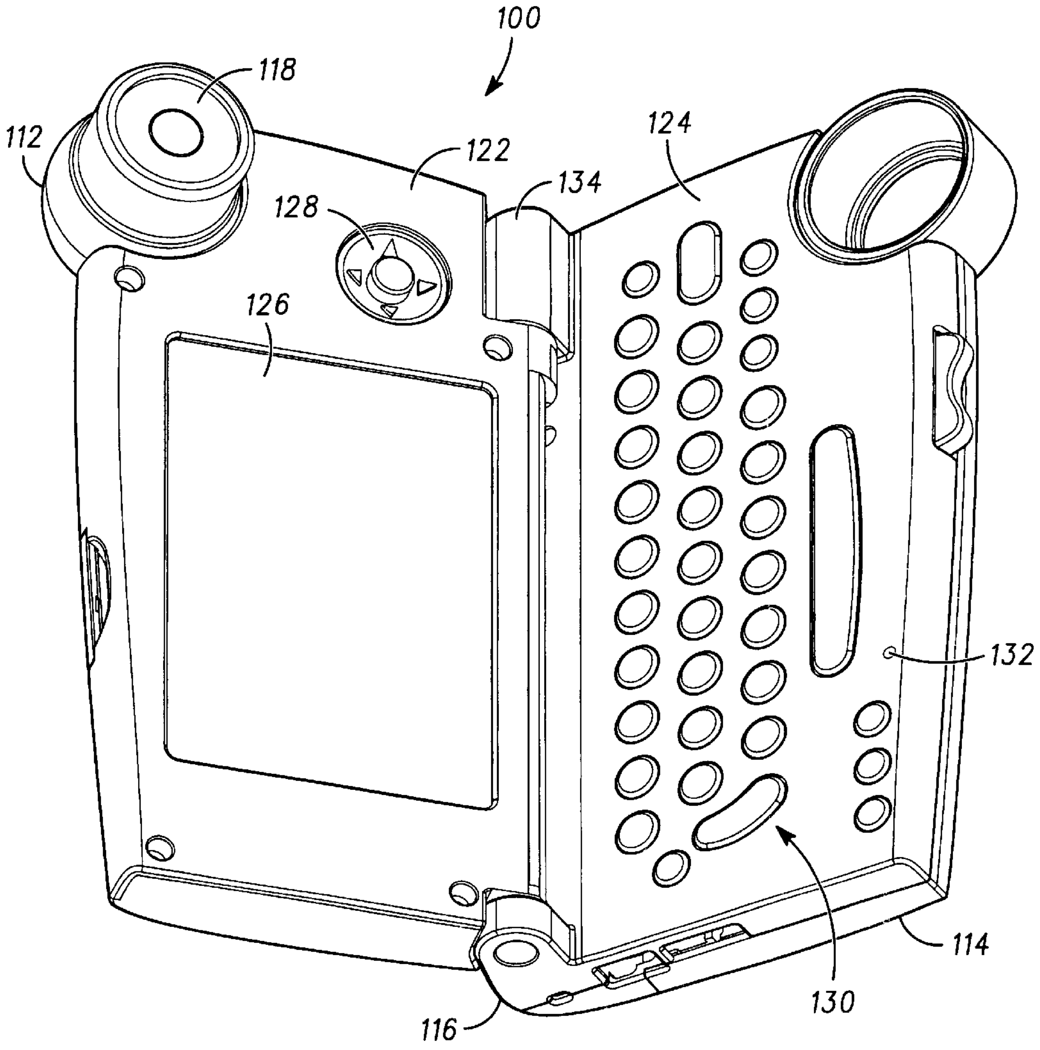
FIG. 3 is a front perspective view of the electronic device illustrated in FIG. 1 in a second operating configuration.

FIGS. 1–3 illustrate an electronic device 100 that has a plurality of operating modes and a corresponding plurality of operable configurations. As shown in FIG. 1, the electronic device 100 may operate as a cellular telephone. Thus, on a face 102 of a first housing member 104 there is disposed a display 106, a speaker port 108, a microphone port 109 and a keypad 10. Secured to the first housing member 104 is an antenna structure 112. As best viewed in FIG. 2, the electronic device 100 has a second housing member 114 that is hingedly secured to the first housing member 104 along a side 116 of the electronic device 100 by a hinge 134. The antenna structure 112 has a round housing 118 encompassing the antenna and extending away from the face 112 through a relief 120 formed in the second housing member 114. Thus, in the configuration of the electronic device 100 illustrated in FIGS. 1–2, the electronic device is and functions as an ordinary cellular telephone.

Referring to FIG. 3, the electronic device 100 is shown in a second operable configuration. The first and second housing members 104, 112 are rotated open along the hinged side 116 to reveal a first inside face 122 formed on the first housing member 104 and a second inside face 124 formed on the second housing member. In the second configuration the electronic device 100 may be operable as an electronic organizer or a wireless email/Internet appliance. Disposed on the first face 122 are a display 126 and a speaker 128, and disposed on the second face 124 is a keypad 130 and a microphone port 132. Any suitable display, keypad, microphone and speaker may be employed to enable the electronic device to function in the manner intended for the second configuration.

Figure 4:
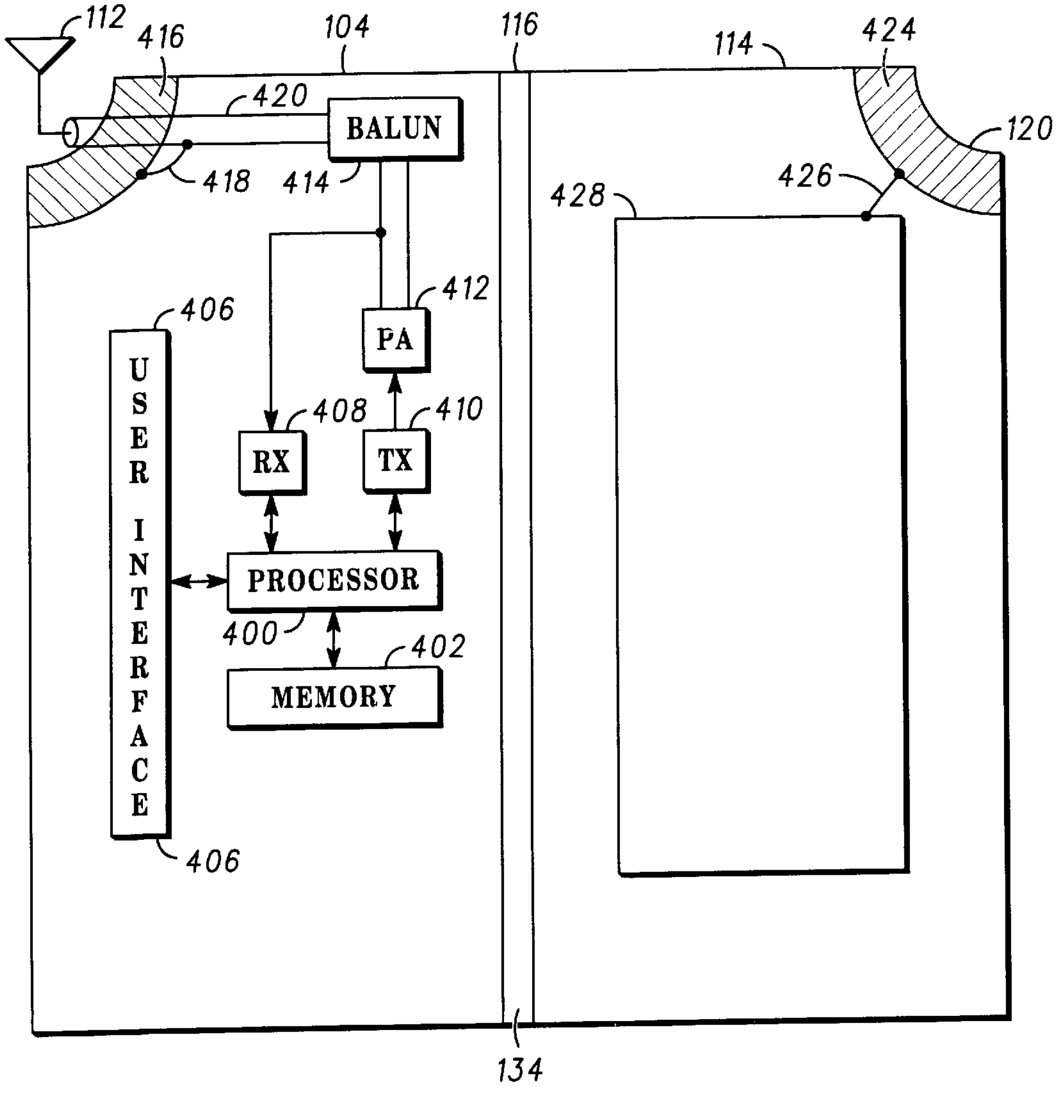
FIG. 4 is a schematic representation of the electronic device illustrated in FIG. 1 in the second configuration.

FIG. 4 illustrates the electronic device 100 structure schematically and functional elements in block diagram.

The electronic device 100 includes a processor 400 that is coupled to a memory 402. The processor 400 may contain a control program or the control program may be retained within the memory 402. The control program directs operation of the processor 402 to control the operation of the electronic device 100 in its various operable configurations. The processor 402 is further coupled to a user interface 406, such as the display 106, speaker 108, microphone 109 and keypad 110 when the electronic device 100 operates in a cellular telephone configuration (FIGS. 1 and 2) and the display 126, speaker 128, keypad 130 and microphone 132 when the electronic device operates in an electronic organizer configuration (FIG. 3).

The electronic device 100 is a wireless device, and as such it includes a radio that includes a receiver 408 couple to the antenna 112 and to the processor 402, and a transmitter 410 coupled to the processor and via a power amplifier 412 and balun 414 to the antenna 112. The antenna 112 is further coupled to a conductive metal plate 416 that is secured within the first housing portion 104 near the first face 122. The first face 122 covers the metal plate 416 such that it is not exposed. In the embodiment of an electronic device shown in FIGS. 1–4, the metal plate 416 is configured to correspond to the shape of the recess 120 formed in the second housing portion 114 adjacent the antenna 112. The metal plate 416 is coupled by way of an RF connector 418 to the ground side of the antenna feed 420 coupling the balun, and hence the power amplifier 412 and the transmitter 410 to the antenna 112. As shown in the equivalent circuit for RF operation in FIG. 5, the balun 414 isolates the metal plate 416 from the first housing portion ground structure 500 at the desired operating frequency.

A second conductive metal plate 424 is secured within the second housing portion 114 near the second face 124. The second face 124 covers the metal plate 424 such that it is not exposed. The metal plate 424 has a shape complimentary to the shape of metal plate 416 and is situated within the second housing portion adjacent the recess 120 formed therein. An RF connector 426 couples the metal plate 424 to a second housing portion ground structure 428.

As depicted in FIGS. 1–3, and without the multi-state ground structure of the electronic device 100 herein described, the contemplated multiple use modes would be incompatible from an antenna perspective. For discussion, the antenna 112 may be a monopole antenna contained with the round housing 118. The monopole antenna is driven against the ground structure 500 of the first housing portion 104 so that the antenna 112 and its ground/counterpoise structure is out of the user's hand when the electronic device is in the second operable configuration (FIG. 2). When used as a cellular telephone in the configuration shown in FIG. 1, and without the described multi-state ground structure the first housing portion 104 would see the high antenna counterpoise current, and hence the antenna would experience poor efficiency when used in the presence of the user's head. It is desirable to have the ground structure 500 within the first housing portion 104 be the primary antenna counterpoise when the electronic device 100 is in the second operable configuration (FIG. 2) and to have the ground structure 428 within the second housing portion 114 be the primary antenna counterpoise when the electronic device 100 is in the first operable configuration (FIG. 1). The multi-state ground structure of the electronic device 100 provides this exactly.

Figure 5:
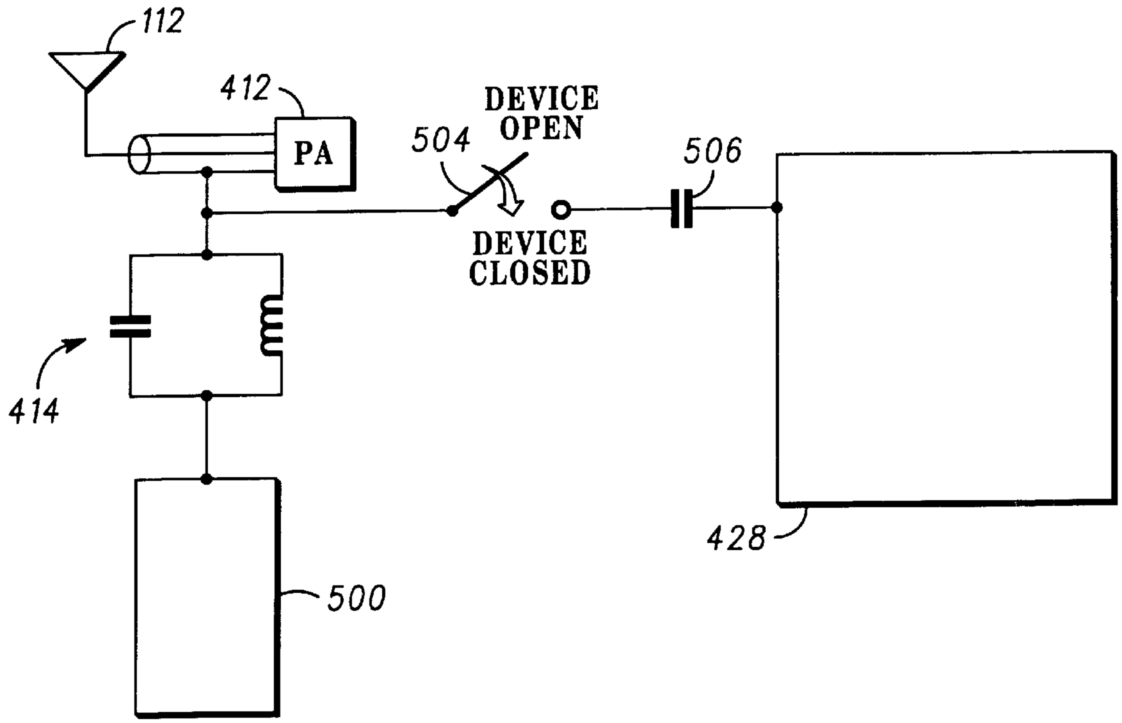
FIG. 5 is a circuit diagram of a multi-state ground structure for an electronic device.

FIG. 5 illustrates schematically the effect of providing metal plates 416 and 424 within the first housing portion 104 and the second housing portion 114, respectively to provide a switch (schematically shown by switch 504 in FIG. 5) between the ground structure 500 and the ground structure 428 depending on the configuration of the electronic device 100. With the electronic device 100 in the configuration shown in FIG. 1, the metal plates 416 and 424 are in close proximity and act as a large capacitor (schematically shown as capacitor 506 in FIG. 5). The large capacitor 506 has low impedance at RF, and thus couples the second ground structure 428 with the antenna as the primary antenna counterpoise as the result of the relatively high impedance presented by the balun 414 and the ground structure 500 in this configuration. Essentially, the switch 504 is closed. With the electronic device in the second operable configuration shown in FIG. 3, the metal plates 416 and 424 are substantially separated and do not act as a capacitor. There exists high impedance between the antenna 112 and the ground structure 428 relative to the impedance presented by the balun 414 and the ground structure 500, and the ground structure 500 acts as the primary antenna counterpoise. Essentially, the switch 504 is open. Thus, as can be seen from the embodiments described herein, a ground structure may be switched between multiple states for a given use mode.

Referring again to FIG. 2, the antenna housing 118 may be configured to house in addition to the antenna 112 a peripheral device. An example of such a peripheral device is a camera 136. Other peripheral devices may be disposed within the housing 136 such as an infra-red transceiver, an optical scanner, a biometric sensor for identifying a user and the like.

Still other modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

We claim:

1. An electronic device comprising:

a first housing portion and second housing portion, wherein the first housing portion and the second housing portion are movable with respect to each other to configure the electronic device in a corresponding first operating mode and a second operating mode, different than the first operating mode;

an antenna having an impedance secured to the first housing portion;

a ground structure disposed within the second housing portion;

a first conductor disposed within the first housing portion and coupled to the antenna to provide an RF ground for the antenna;

a second conductor disposed within the second housing portion and coupled to the ground structure;

wherein, with the electronic device configured for operation in the first operating mode, the first conductor and the second conductor are disposed substantially proximate each other and a low impedance path between the antenna and the ground structure exists and with the electronic device configured in the second operating mode, the first conductor and the second conductor are disposed substantially distant of one another and a high impedance path between the antenna and the ground structure exists.

2. The electronic device of claim 1, wherein the first conductor and the second conductor are plate-like structures.

3. The electronic device of claim 1, further comprising a peripheral device secured to the first housing portion, the antenna being contained within the peripheral device.

4. The electronic device of claim 3, wherein the peripheral device comprises a camera.

5. The electronic device of claim 1, wherein in the first operating mode the electronic device functions as one of: a cellular telephone, a pager, a personal digital assistant, a wireless email appliance and a wireless Internet appliance.

6. The electronic device of claim 1, wherein in the second operating mode the electronic device functions as one of: a cellular telephone, a pager, a personal digital assistant, a wireless email appliance and a wireless Internet appliance.

7. A cellular telephone having a first housing portion and second housing portion, wherein the first housing portion and the second housing portion are movable with respect to each other to configure from a cellular telephone configuration to a second operable configuration, the cellular telephone comprising comprising:

an antenna having an impedance secured to the first housing portion;

a ground structure disposed within the second housing portion;

a first conductor disposed within the first housing portion and coupled to the antenna to provide an RF ground for the antenna;

a second conductor disposed within the second housing portion and coupled to the ground structure;

wherein, in the cellular telephone configuration the first conductor and the second conductor are disposed substantially proximate each other and a low impedance path between the antenna and the ground structure exists and with the second operable configuration, the first conductor and the second conductor are disposed substantially distant of one another and a high impedance path between the antenna and the ground structure exists.

8. The cellular telephone of claim 7, wherein the first conductor and the second conductor are plate-like structures.

9. The cellular telephone of claim 7, further comprising a peripheral device secured to the first housing portion, the antenna being contained within the peripheral device.

10. The cellular telephone of claim 9, wherein the peripheral device comprises a camera.

11. The cellular telephone of claim 7, wherein in the second operable configuration the cellular telephone functions as one of: a pager, a personal digital assistant, a wireless email appliance and a wireless Internet appliance.

12. An electronic device comprising:

a housing having a first housing portion and a second housing portion, the first housing portion and the second housing portion being movable with respect to each other to configure the electronic device in a first operable configuration and a second operable configuration, different than the first operable configuration;

an antenna secured to the housing;

a ground structure having a first state and a second state corresponding to a first portion of the ground structure being coupled to the antenna and a second portion of the ground structure being coupled to the antenna, respectively; and a switch selectively coupling the first portion of the ground structure to the antenna and the second portion of the ground structure to the antenna based upon the electronic device being in the first operable configuration and the second operable configuration, respectively.

13. The electronic device of claim 12, wherein the switch comprises a first metal plate secured within the first housing portion and a second metal plate secured within the second housing portion.

14. The electronic device of claim 12, wherein the first portion of the ground structure is disposed within the first housing structure and the second portion of the ground structure is disposed within the second housing portion.

15. The electronic device of claim 12, wherein in the first operating mode the electronic device functions as one of: a cellular telephone, a pager, a personal digital assistant, a wireless email appliance and a wireless Internet appliance.

16. The electronic device of claim 12, wherein in the second operating mode the electronic device functions as one of: a cellular telephone, a pager, a personal digital assistant, a wireless email appliance and a wireless Internet appliance.

* * * * *